US006877574B2

(12) United States Patent
Thompson et al.

(10) Patent No.: US 6,877,574 B2
(45) Date of Patent: Apr. 12, 2005

(54) MODULAR ROBOTIC TEACHING TOOL

(75) Inventors: Mary Kathryn Thompson, North Huntingdon, PA (US); John M. Thompson, North Huntingdon, PA (US); Raymond L. Speth, Davenport, IA (US); Hani M. Sallum, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 34 days.

(21) Appl. No.: 10/223,262

(22) Filed: Aug. 19, 2002

(65) Prior Publication Data

US 2003/0051932 A1 Mar. 20, 2003

Related U.S. Application Data

(60) Provisional application No. 60/322,397, filed on Sep. 14, 2001, provisional application No. 60/322,398, filed on Sep. 14, 2001, and provisional application No. 60/322,399, filed on Sep. 14, 2001.

(51) Int. Cl.[7] .............................................. B60K 1/00
(52) U.S. Cl. ...................................... 180/65.1; 446/454
(58) Field of Search ............................... 180/65.1, 167, 180/291, 299; 446/454, 455, 456, 175, 465, 484, 93, 95, 485; D21/533; 901/1, 48, 50

(56) References Cited

U.S. PATENT DOCUMENTS 3,609,014 A * 9/1971 Kurz, Jr. ..................... 359/874

| | | | | |
|---|---|---|---|---|
| 4,224,762 A | * | 9/1980 | McCaslin | 446/456 |
| 4,547,160 A | * | 10/1985 | Labelle | 434/195 |
| 4,938,483 A | * | 7/1990 | Yavetz | 463/5 |
| 5,310,376 A | * | 5/1994 | Mayuzumi et al. | 446/107 |
| 6,074,271 A | * | 6/2000 | Derrah | 446/457 |
| D461,855 S | * | 8/2002 | Ewert | D21/533 |
| 6,454,036 B1 | * | 9/2002 | Airey et al. | 180/167 |
| 6,454,624 B1 | * | 9/2002 | Duff et al. | 446/91 |
| 6,459,955 B1 | * | 10/2002 | Bartsch et al. | 700/245 |
| 6,482,064 B1 | * | 11/2002 | Lund | 446/175 |
| 6,491,566 B1 | * | 12/2002 | Peters et al. | 446/454 |
| 6,674,259 B1 | * | 1/2004 | Norman et al. | 318/568.11 |

* cited by examiner

Primary Examiner—Christopher P. Ellis
Assistant Examiner—Christopher Bottorff
(74) Attorney, Agent, or Firm—Sampson & Associates

(57) ABSTRACT

A modular robotic teaching tool including a plurality of modules that may be operated, for example, to play robot soccer, for introducing principles of mechanical engineering and robotics to prospective students. The teaching tool includes a modular robot that may be assembled in a plurality of configurations. The modular robot includes a body portion, first and second motors, first and second motor mounts, at least three wheels, two of which are mountable to the motors, at least one flipper module, and a remote control module for actuating the motors and the flipper module. The modular robot is advantageous in that it provides for an inexpensive, challenging, and entertaining introduction to some of the principles of robotics and mechanical engineering.

22 Claims, 16 Drawing Sheets

MODULAR ROBOTIC TEACHING TOOL

This application claims the benefit of U.S. Provisional Application Ser. No. 60/322,397, entitled Modular Robot, filed on Sep. 14, 2001; U.S. Provisional Application Ser. No. 60/322,398, entitled Motor Mount for a Modular Robot, filed on Sep. 14, 2001; and U.S. Provisional Application Ser. No. 60/322,399, entitled Thermoform Hat for a Modular Robot, filed on Sep. 14, 2001.

BACKGROUND OF THE INVENTION (1) Field of the Invention

The present invention relates generally to robotics and particularly to a modular robot configured to provide prospective students with an introduction to mechanical engineering and robotics principles.

(2) Background Information

The problem of declining enrollment in Mechanical Engineering in colleges and universities such as the Massachusetts Institute of Technology has been noted. Many students that might otherwise be interested in studying mechanical engineering have been attracted to other disciplines that may be more "glamorous" and offer potentially higher salaries upon graduation.

One potential method for generating interest and enthusiasm in mechanical engineering is to conduct a seminar, which provides a challenging educational experience for the student. Some principle objectives of such a seminar are to: (i) introduce the discipline of mechanical engineering and generate interest therein, (ii) introduce the potential students to the faculty, (iii) allow potential students to meet other potential students or current undergraduate and/or graduate students, and (iv) introduce the potential students to the facilities available to those studying mechanical engineering.

Therefore, there exists a need for a need for a project suitable for use in a seminar environment, that provides a challenging educational experience and that also meets at least a portion of the above objectives.

SUMMARY OF THE INVENTION

One aspect of the present invention includes a modular robot for introducing principles of mechanical engineering and robotics to prospective students. The modular robot includes a plurality of modules including a body module and first and second motors, which are mountable to the body module and typically include battery powered electric motors. The modular robot further includes first and second motor mounts, each including a mounting portion which defines a plane to provide stable contact with the body module, at least three wheels, a first of which is operatively engageable with the first motor, a second of which is operatively engageable with the second motor, and one other of which is mountable to the body module, and at least one flipper module which is mountable to the body module and includes an actuatable flipper. The modular robot further includes a remote control module adapted to provide for actuation control of at least one other of the plurality of modules. The first and second motors and the flipper module are electrically connectable to the remote control module, and the modular robot may be assembled in any one of a plurality of configurations.

Another aspect of this invention includes an instructional tool for generating interest in mechanical engineering and introducing prospective students to principles of mechanical engineering and robotics. The instructional tool includes a kit of parts which includes a plurality of modules and instructions for assembling a modular robot. The plurality of modules includes a body module including a plastic sheet having a plurality of holes formed therein for the mounting of others of the plurality of modules, first and second motors which are mountable to the body module and typically include battery powered electric motors, and first and second motor mounts each of which includes a mounting portion which defines a plane to provide stable contact with the body module. The kit of parts further includes at least three wheels, a first of which is operatively engageable with the first motor, a second of which is operatively engageable with the second motor, and one other of which is mountable to the body module and at least one flipper module which is mountable to the body module and includes an actuatable flipper. The kit of parts further includes a remote control module adapted to provide for actuation control of at least one other of said plurality of modules and a plurality of fasteners and electrical connectors for respectively assembling and wiring the modular robot.

A further aspect of this invention includes a method for generating interest in mechanical engineering and introducing students to principles of mechanical engineering and robotics The method includes providing an instructional tool as described in the preceding paragraph and assisting the students in the assembly of a modular robot using the kit of parts (also described in the preceding paragraph), wherein the students assemble the modular robot and wherein the modular robot may be assembled in any one of a plurality of configurations.

Still a further aspect of this invention includes a motor mount for a modular robot, the modular robot including a body module having a substantially planar mounting plate, a motor having an irregular frusto-conical exterior surface, and a plurality of wheels mounted to the body module, at least one of the wheels being operatively engageable with the motor. The motor mount includes a first motor mount portion and a second motor mount portion. At least one of the two motor mount portions includes a mounting portion, which defines a plane. The first motor mount portion and the second motor mount portion are each sized and shaped for surface-to-surface engagement with a substantially 180 degree portion of the exterior surface of the motor, wherein the first motor mount portion and the second motor mount portion are configured to firmly sandwich the motor therebetween upon fastening one to another.

Still another aspect of this invention includes a housing for a modular robot including a body module and a remote control module, the housing being suitably sized and shaped for mounting to the body module and for enclosing and protecting the remote control module. The housing includes a plastic sheet formed into a hollow shell by the process of thermoforming. The hollow shell includes a plurality of fins disposed thereon and a plurality of reliefs and indentations in the surface thereof for providing mechanical rigidity and an appealing aesthetic appearance. The housing is configured for mounting to the body module.

DETAILED DESCRIPTION

Figure 1:
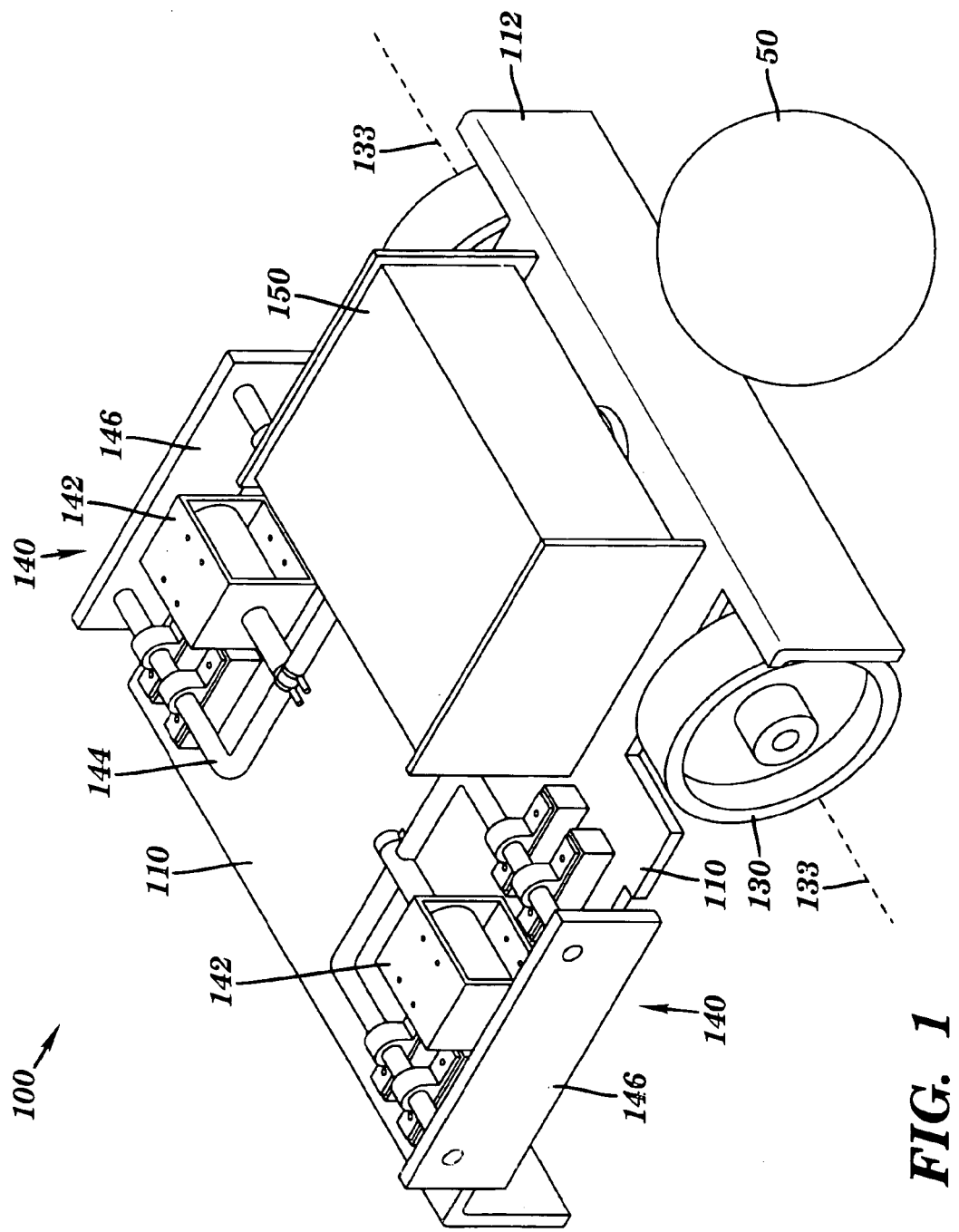
FIG. 1 is a perspective view of one embodiment of the modular robot of this invention.

Referring to FIGS. 1–6, the present invention includes a modular robot 100, 100', 100" that may be operated, for example, to play radio controlled robotic soccer (FIG. 1 shows robot 100 in close proximity to a soccer ball 50). The modular robot 100, 100', 100" of this invention may also be referred to as a soccer robot. The soccer robot 100, 100', 100" typically includes several modules that may be assembled in any of several configurations. The modular robot 100, 100', 100" is therefore not defined by any one configuration, but by the sum of a plurality of modules. The present invention also includes a method and a teaching tool for teaching principles of mechanical engineering and robotics to prospective students, e.g., engineering and science undergraduate students and/or high school students. The method and modular robot 100, 100', 100" of this invention are advantageous in that they provide for an inexpensive, challenging and entertaining introduction to some of the principles of robotics and mechanical engineering and are expected to substantially increase interest in mechanical engineering.

Referring again to FIGS. 1–6, the robot 100, 100', 100" includes a body (also referred to as baseplate or a frame) 110 for supporting other modules (e.g., motor mounts 122 as described hereinbelow) and optionally for providing surface area for making contact with a soccer ball 50. The body 110 may be fabricated from any of numerous materials, such as ABS, polycarbonate, or other plastics, wood, and/or aluminum. It is generally desirable that the body 110 be manufactured from a relatively light and inexpensive material, such as a Lexan® (General Electric Company Corporation, Pittsfield, Mass.) or ABS plastic sheet having approximate dimensions of 12×18×¼ inch. The body module 110 may further include a plurality of holes 114 (FIG. 3) in a predetermined pattern for mounting other modules, such as motor mounts 122, wheels 130, 132, solenoids 142, and the like, however students may optionally drill additional holes for mounting the above mentioned and other modules. The robot 100, 100', 100" optionally includes one or more bumpers 112. The bumpers 112 may be mounted to the body 110 or be an integral part thereof. For example, in the embodiments shown in FIGS. 1–6, bumpers 112 may be fashioned by heating and bending one or more ends of the plastic sheet of the body module 110 to an orientation approximately perpendicular to the plane of the sheet 110.

Exemplary embodiments of the modular robot 100, 100', 100" of this invention typically include two motors 120. The motors 120 may include any electric (e.g., battery powered) motors, such as those manufactured by Bosch® (Robert Bosch Corporation, Federal Republic of Germany), Black and Decker Corporation (Towson, Md.), and the like. In one embodiment, electric screwdriver motors manufactured by Black and Decker Corporation may be modified and used. The motors 120 may be mounted to the body 110 using motor mounts 122. Exemplary motor mounts, such as formed by the process of injection molding, are discussed in more detail hereinbelow with respect to FIGS. 8–13. In another embodiment, each motor 120 may be mounted in a PVC piping T-junction (not shown in the Figs.). The essentially cylindrical motor may be mounted in one opening (e.g., a 1¼" diameter opening) by conventional hose clamps for example. In order to attain a relatively snug fit, a layer of pipe insulation may also be inserted in the piping or wrapped around the motor. The remainder of the T-junction may be used to attach the mount (including the motor) to the body 110.

Embodiments of the modular robot 100, 100', 100" typically further include a plurality of wheels 130, 132. In general, any wheel type is suitable. The wheels may be fabricated with a water jet cutter or may be purchased from companies such as McMaster-Carr® Supply Company (Elmhurst, Ill.), K'Nex Industries, Incorporated (Hatfield, Pa.), and the like. Polymer (e.g., polyolefin) or rubber wheels are typically desirable in that they provide for good traction, are easy to use, and are inexpensive. Additional traction may be provided by using a flexible rubber coating, such as a Plasti Dip® coating (Plasti Dip International, Blaine, Minn.). In one embodiment, the robot 100, 100', 100" includes two drive wheels 130 and two other wheels 132, which may be mounted to the body portion 110. The drive wheels 130 may be polyolefin wheels (e.g., four inch diameter) mountable directly to the motor 120 shafts. The other wheels 132 may be caster wheels (e.g., two inch diameter) mountable directly to body module 110.

Figure 2:
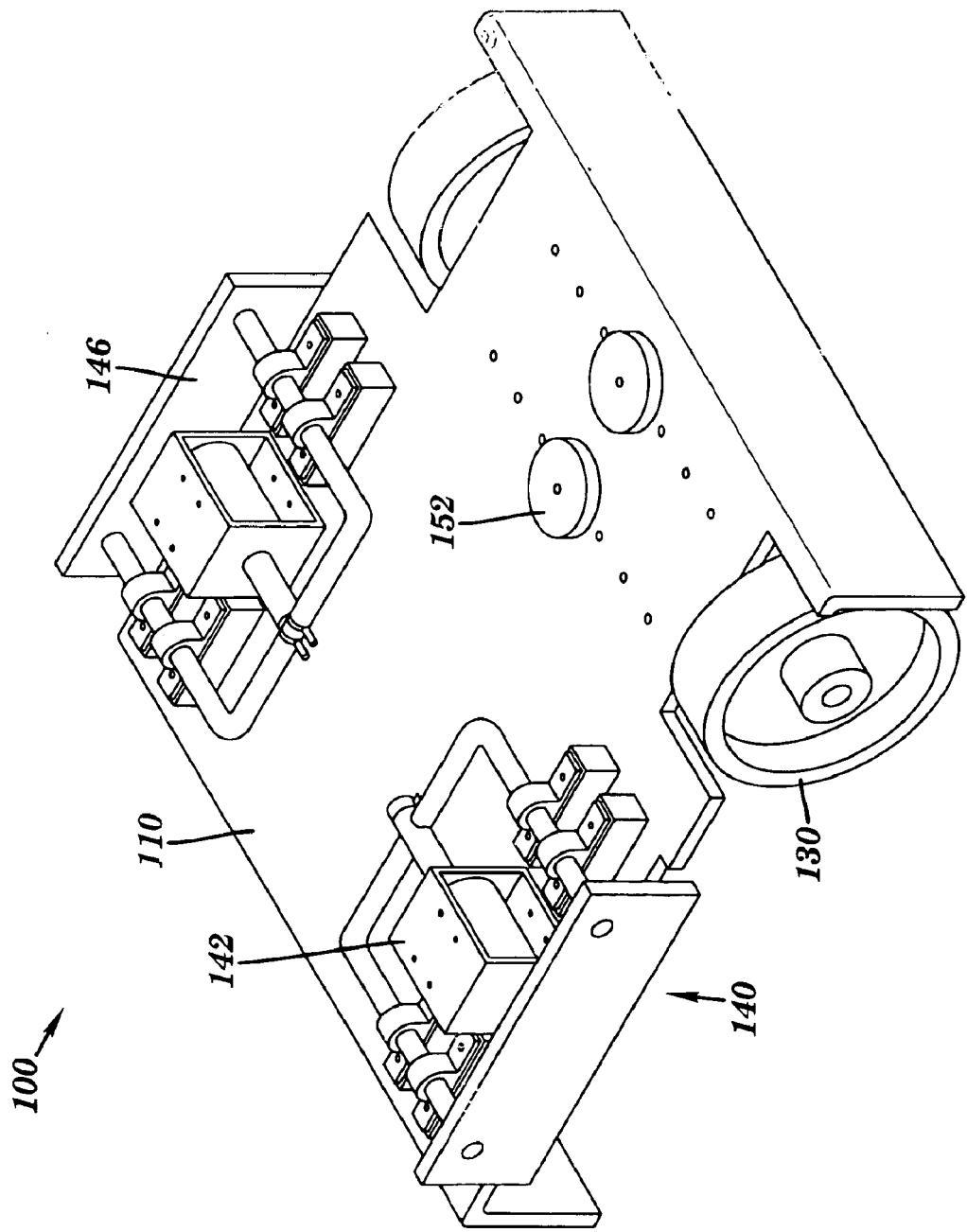
FIG. 2 is a similar view to that of FIG. 1, but not including a remote control module mounted thereto.
Figure 3:
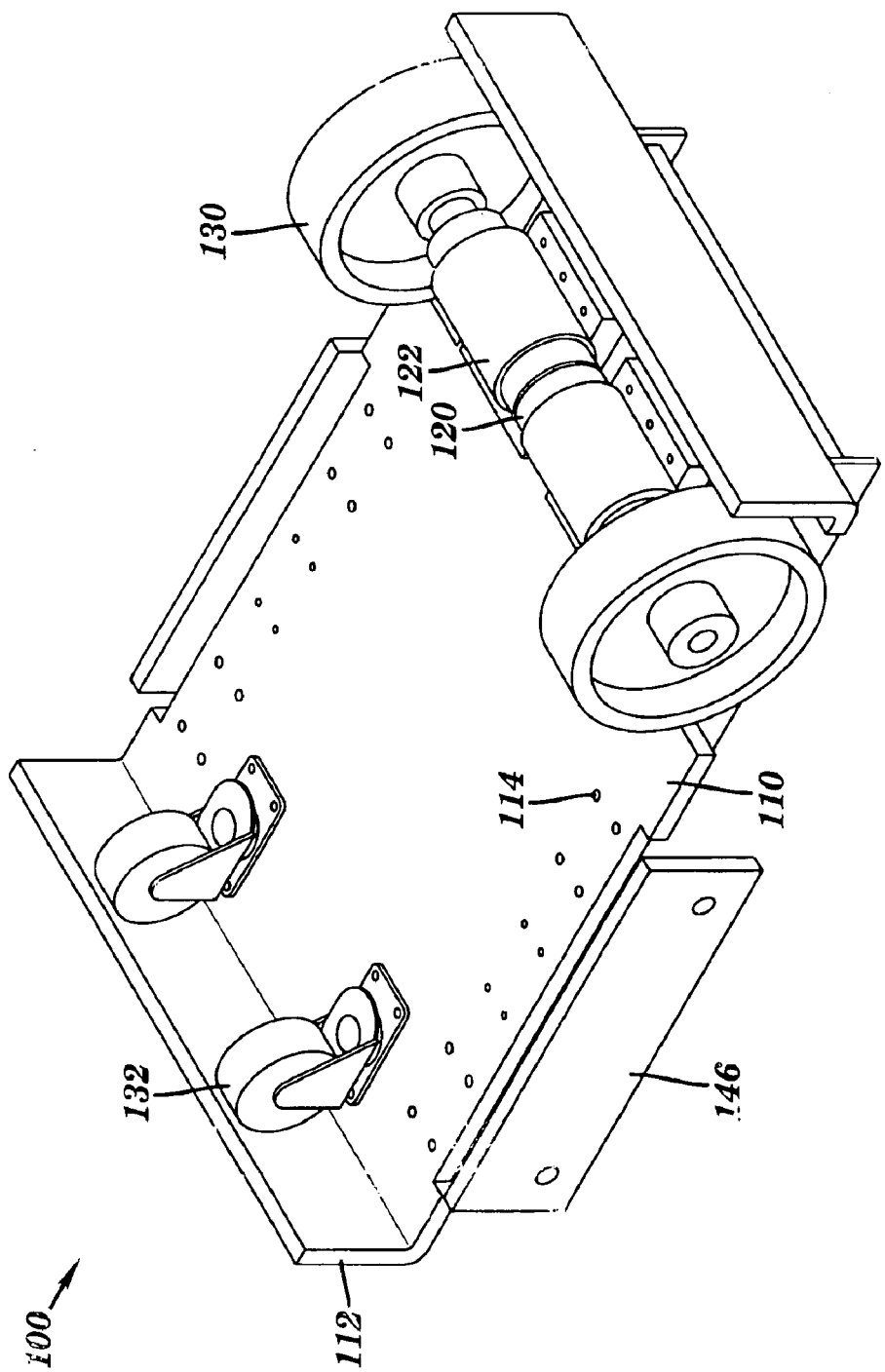
FIG. 3 is another perspective view of the embodiment shown in FIG. 1.
Figure 4:
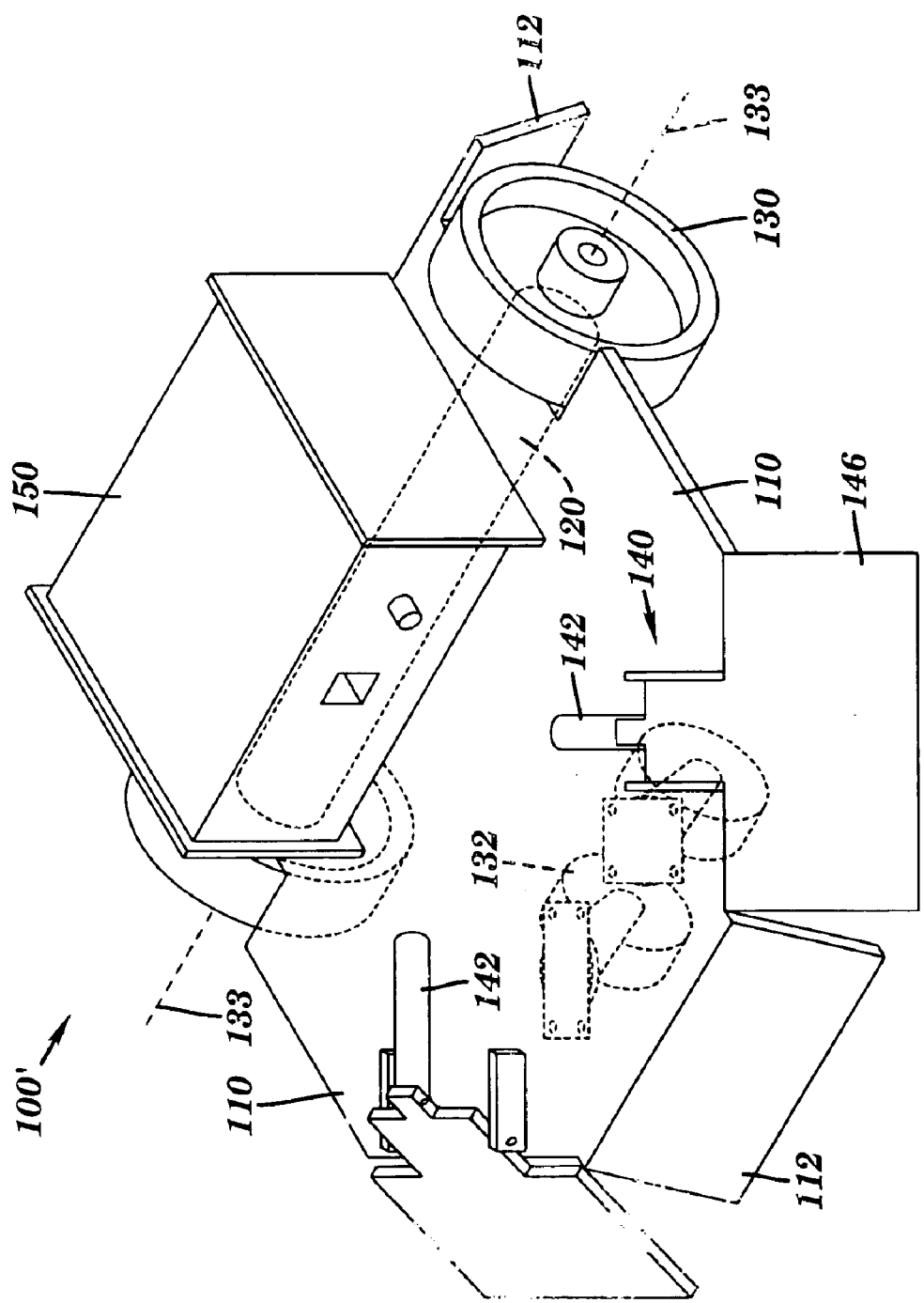
FIG. 4 is a perspective view of another embodiment of the modular robot of this invention.
Figure 5:
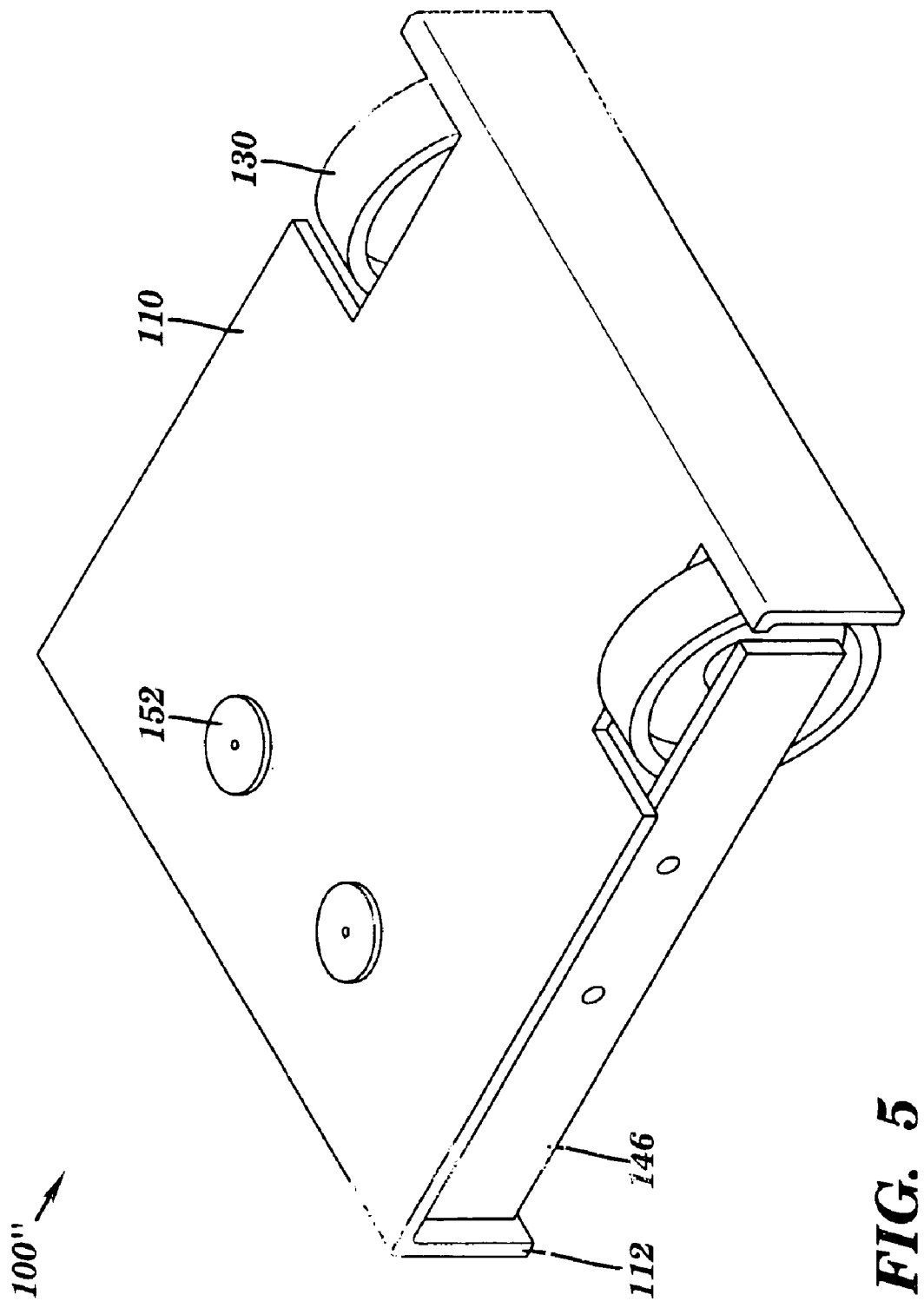
FIG. 5 is a perspective view of yet another embodiment of the modular robot of this invention.
Figure 6:
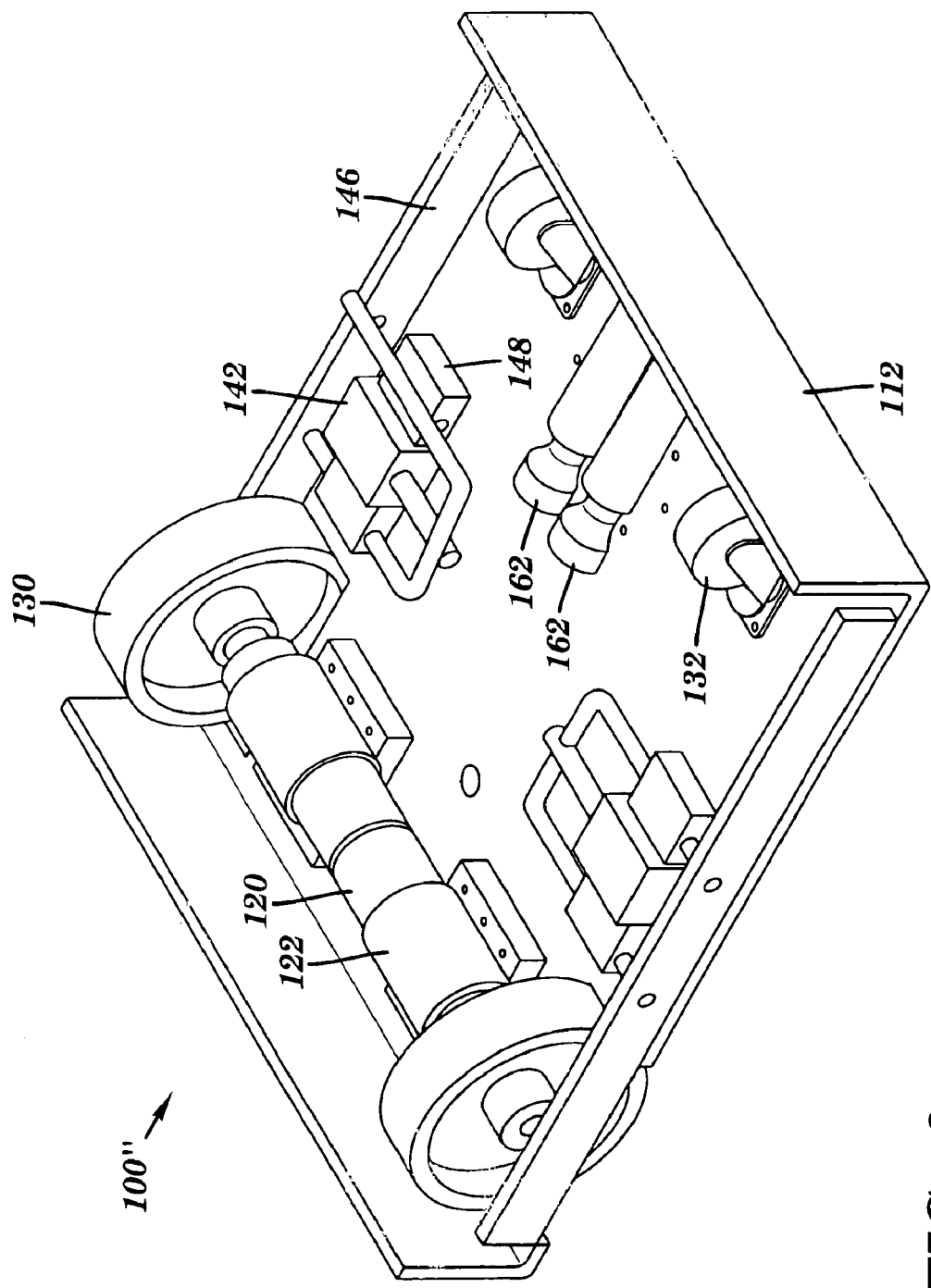
FIG. 6 is another perspective view of the embodiment shown in FIG. 5.

Embodiments of the modular robot 100, 100', 100" may further include one or more flipper modules 140. The flippers modules 140 are typically powered by conventional solenoids 142 and mounted to one or more sides of the body 110, e.g., the top side as shown in FIGS. 1–3 or the under side as shown in FIGS. 5–6. Alternatively, a conventional electric motor may be utilized to power flipper modules 140, e.g., in combination with a conventional rack and pinion arrangement. In embodiments 100 and 100" (FIGS. 1–3 and 5–6), actuation of the solenoids 142 moves a U-shaped rod assembly 144, which is coupled to the flippers 146 and may be supported by bearing blocks 148 (FIG. 6). The flippers 146 typically include a rectangular sheet of plastic and may be mounted to "flip" (i.e., to move) in substantially any direction, such as vertically, horizontally, or at a 45-degree angle. Further, although the embodiments shown utilize linearly actuated flippers 146, the flippers may be actuated rotationally, e.g., by hinging them (not shown) at one end to provide for rotary motion thereof. The skilled artisan will recognize that many other techniques for rotationally actuating the flippers, such as mounting the flippers directly to a motor shaft, may also be used without departing from the spirit and scope of the present invention.

The modular robot 100, 100', 100" typically further includes a remote control module 150 for enabling a user (e.g., a student) to actuate at least one of the actuatable modules, such as the motors 120 and/or flipper modules 140. In one embodiment, the remote control module 150 includes a radio receiver housed in a steel box or between two steel plates and is mounted to the body module 110 via one or more magnets 152 (FIGS. 2 and 5), which provide for relatively quick and easy mounting (conventional fasteners such as screws or clips may also be used). Actuatable modules (e.g., the flipper modules 140 and motors 120) are electrically connected to the remote control system, typically by one or more AMP® (Aircraft-Marine Products, Inc., Harrisburg, Pa.) connectors (not shown in the Figs.). Remote control module 150 may include a conventional 3 or 4 channel device operable by a suitable 3 or 4 channel transmitter (not shown), such as commonly used by hobbyists for radio controlled model automobiles and airplanes. For example, two channels may be used to respectively control the speed of each motor 120, while an additional channel(s) may be used to actuate flipper module(s) 140. The skilled artisan will recognize that the modular robot 100, 100', 100" may be steered by independently controlling the rotational speed of each motor 120.

In an alternate embodiment, remote control module 150 may include a control box that may be electrically connected to the modular robot 100, 100', 100", such as by a conventional tether (e.g., an eight lead cable). Such a control box may include a plastic project box including various toggle and/or rocker switches such as may be obtained from Radio Shack® (Tandy Corporation, Fort Worth, Tex.) or McMaster-Carr®. The tether typically includes an 18 gauge, 8 lead cable coupleable to an AMP connector.

The modular robot 100, 100', 100" may optionally include one or more batteries mounted to the body 110 for powering the actuatable modules (e.g., motors 120 and solenoids 142). In one embodiment 100" (FIG. 6) two batteries (e.g., obtained from the battery powered screwdriver motors 120) are mounted to the underside of body 110.

The modular robot 100, 100', 100" may still further include a housing in the form of a hat or covering for enclosing and protecting modules thereof (e.g., remote control module 150). The housing may also provide for decorative adornment and/or identification of the modular robot 100, 100', 100" and may therefore be provided with substantially any identifying coloring, indicia and/or symbols. The housing may be substantially any shape provided that it substantially covers the remote control module 150, and that it does not interfere with actuation of flipper modules 140 or motors 120 (e.g., by impinging upon flippers 146 or wheels 130, respectively).

Figure 7A:
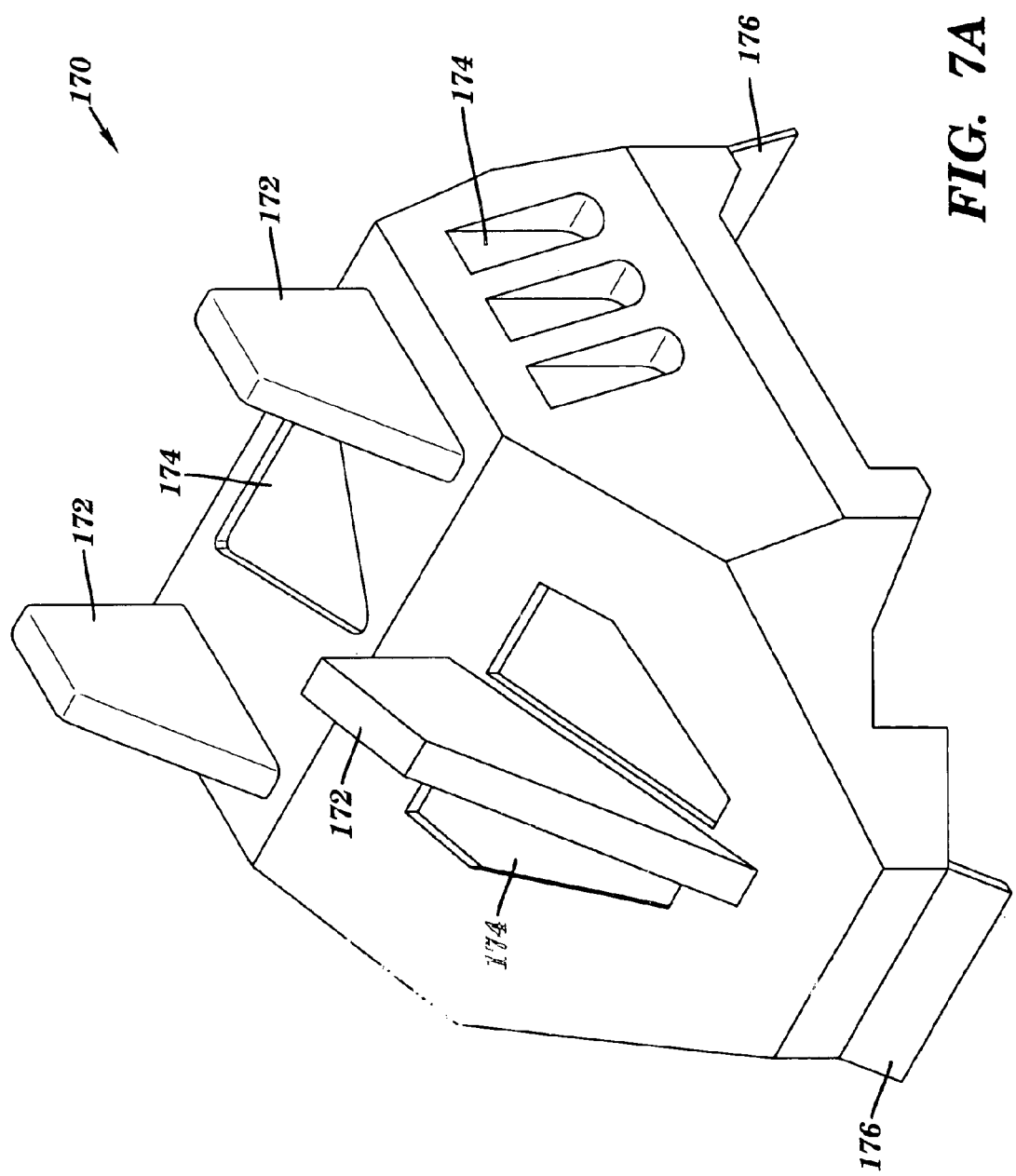
FIG. 7A is a perspective view of one embodiment of an optional housing for the modular robot of FIGS. 1–6.
Figure 7B:
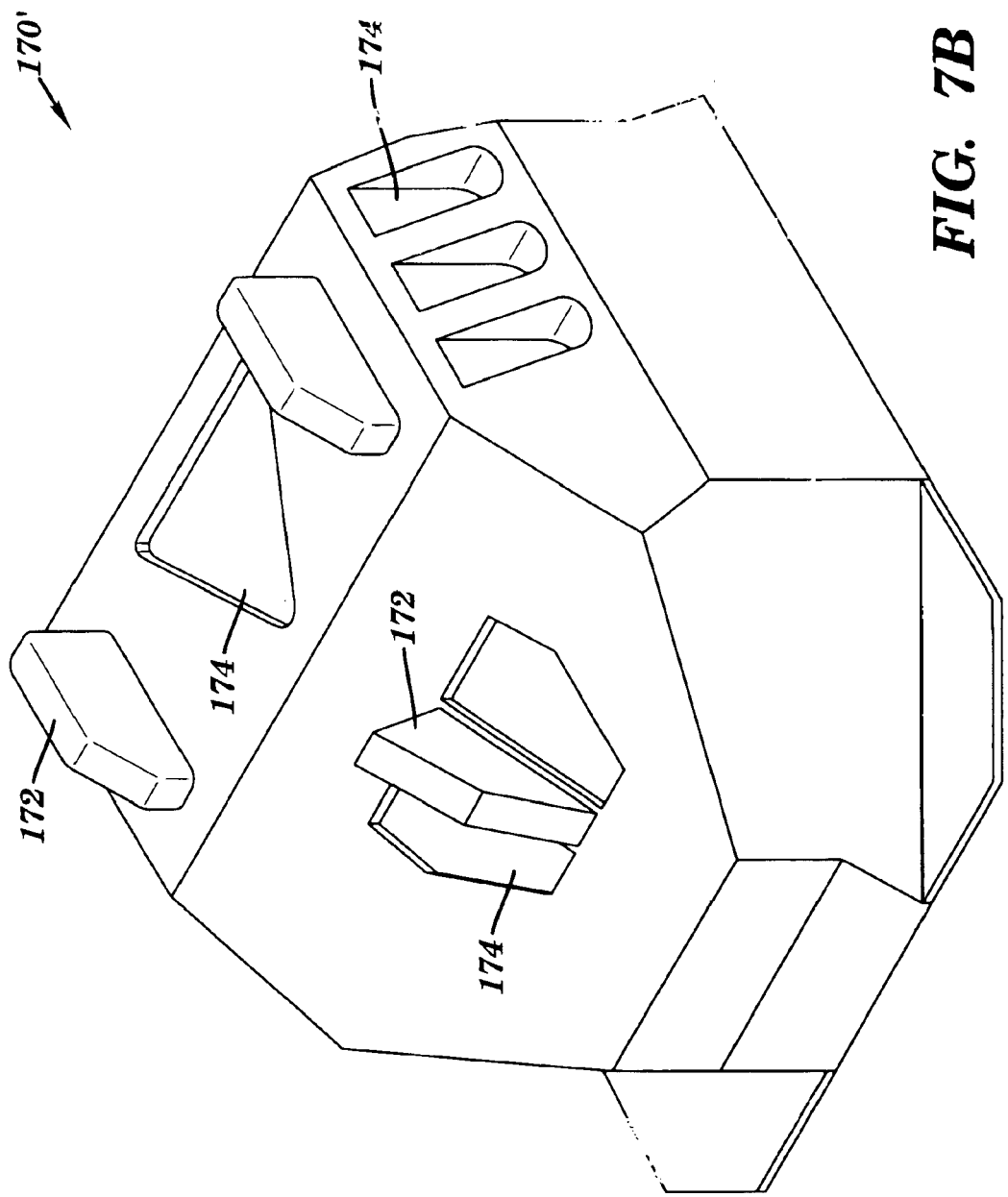
FIG. 7B is a perspective view of another embodiment of an optional housing for the modular robot of FIGS. 1–6.

Referring now to FIGS. 7A and 7B, two generally desirable embodiments of a housing 170, 170' are shown. Housing 170, 170' is typically fabricated by a thermoforming process, in which a sheet of relatively thin plastic is heated until pliable. A mold is then pressed through the pliable sheet with a vacuum being used to pull it into the features of the mold. Housing 170 may include a plurality of fins 172 for primarily decorative purposes. The fins 172 are typically tapered, which allows multiple housings to be stacked (e.g., for storage) in an interlocking fashion. Housing 170, 170' may further include a plurality of indentations 174 in the surface thereof to provide both enhanced rigidity and an aesthetically pleasing look. Velcro® (Velcro Industries B.V. Corporation, Amsterdam, Netherlands) tabs 176 may be provided to facilitate coupling of the housing 170 to modular robot 100, 100', 100" (FIGS. 1–6). Housing 170, 170' is typically further configured to allow for numerous flipper module 140 configurations.

Figure 8:
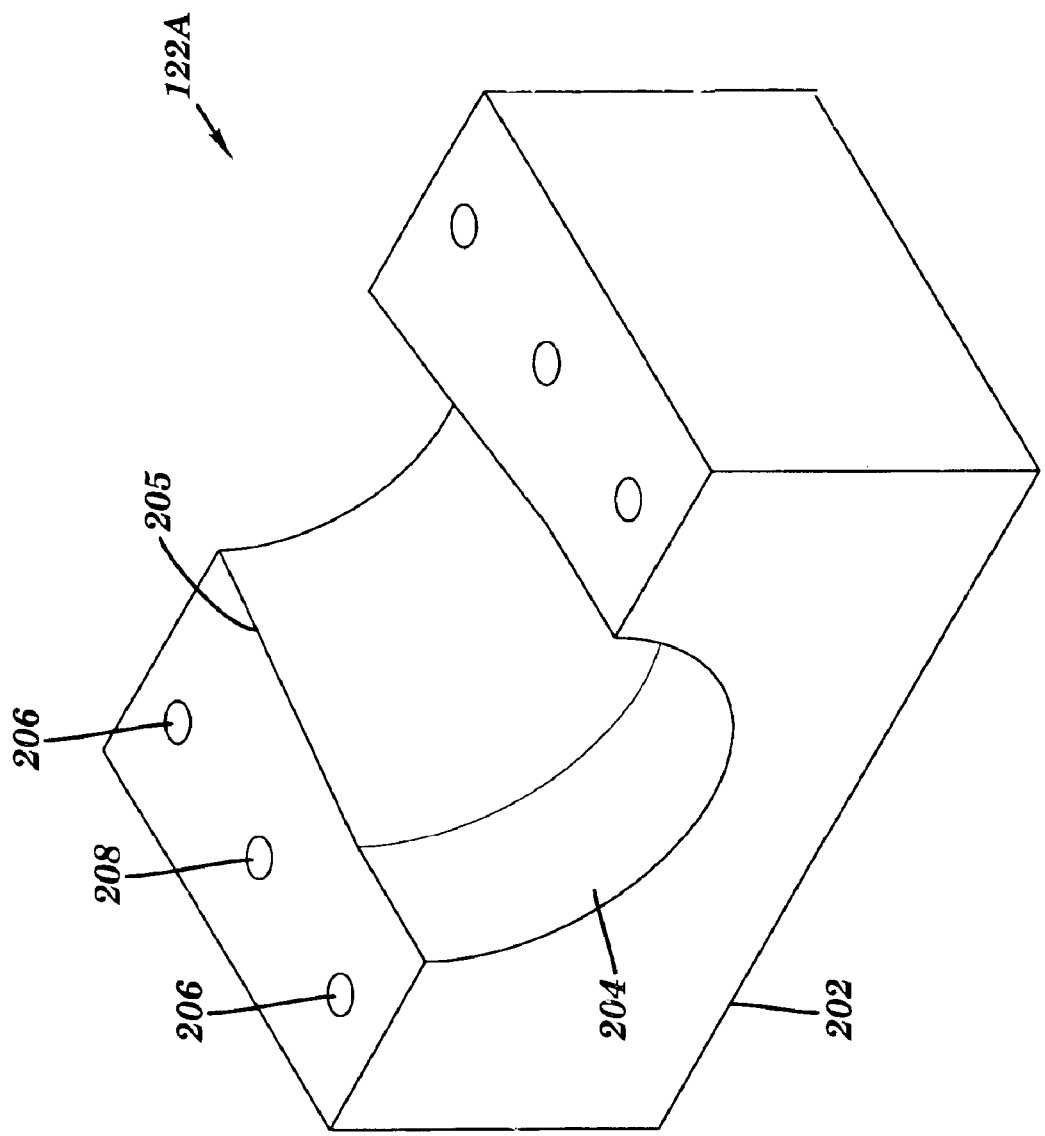
FIG. 8 is a perspective view of one embodiment of an upper motor mount used in the modular robot of this invention.
Figure 9:
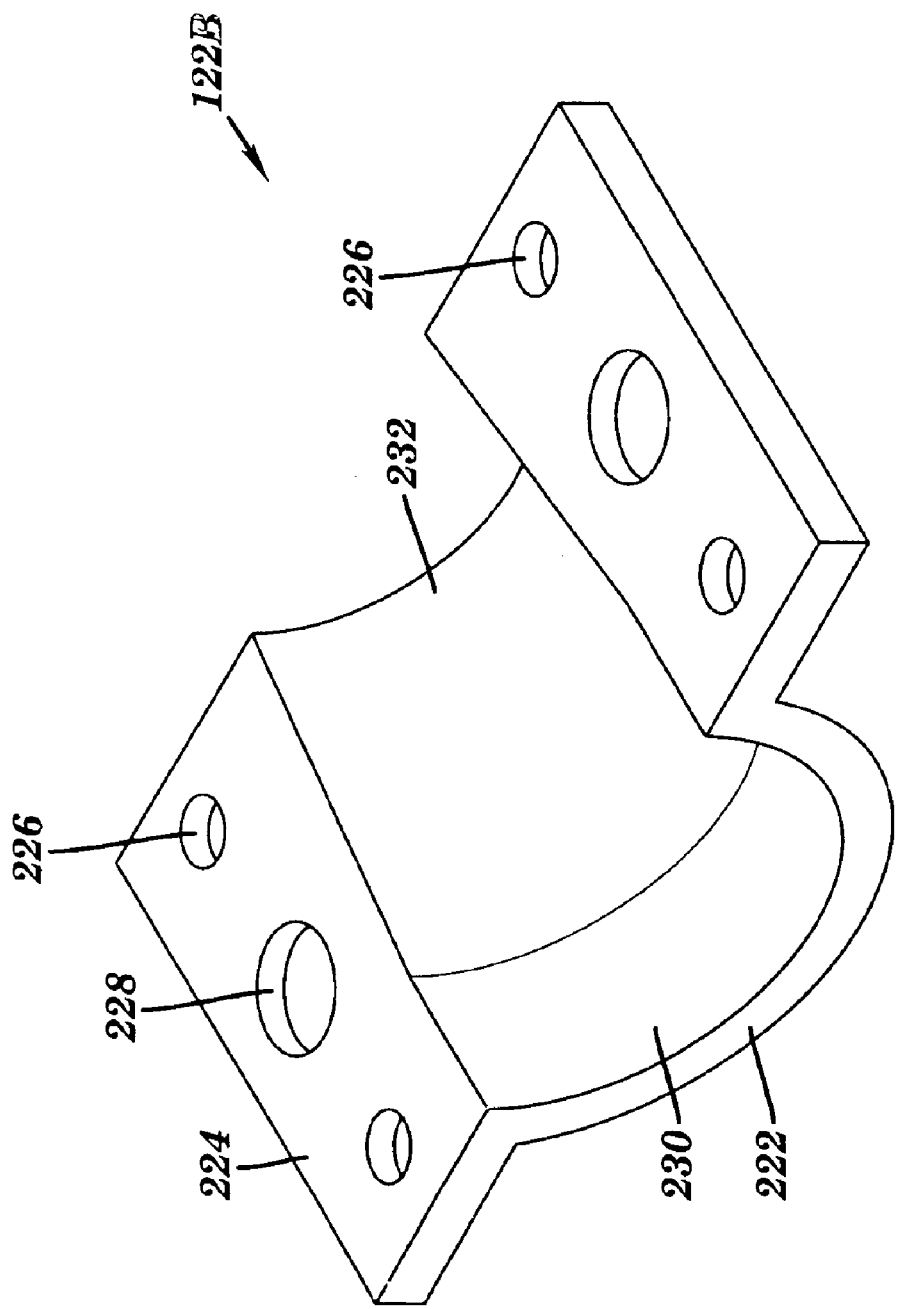
FIG. 9 is a perspective view of one embodiment of a lower motor mount used in the modular robot of this invention.
Figure 10:
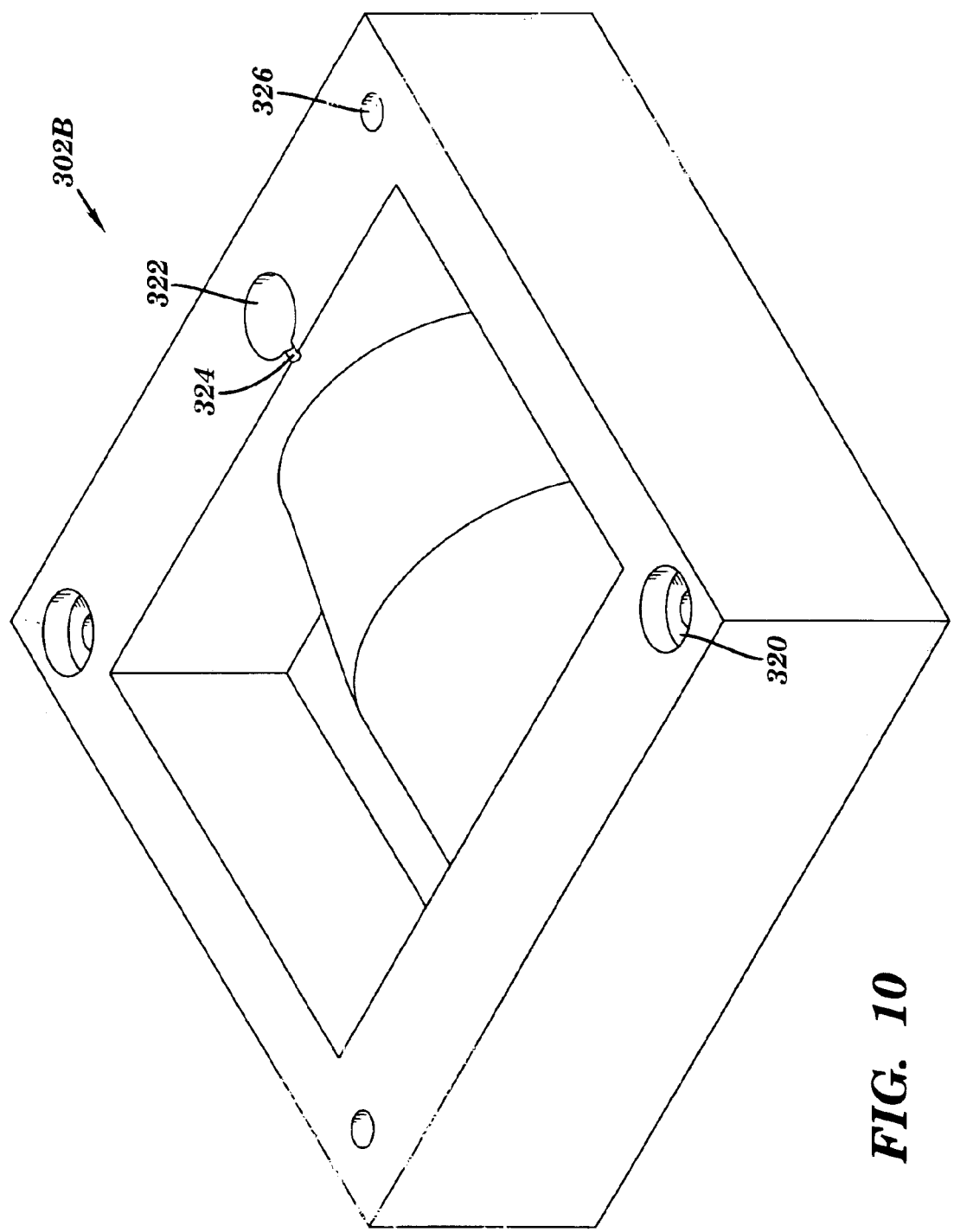
FIG. 10 is a perspective view of one embodiment of a mold cavity used to fabricate the upper motor mount of FIG. 8.
Figure 11:
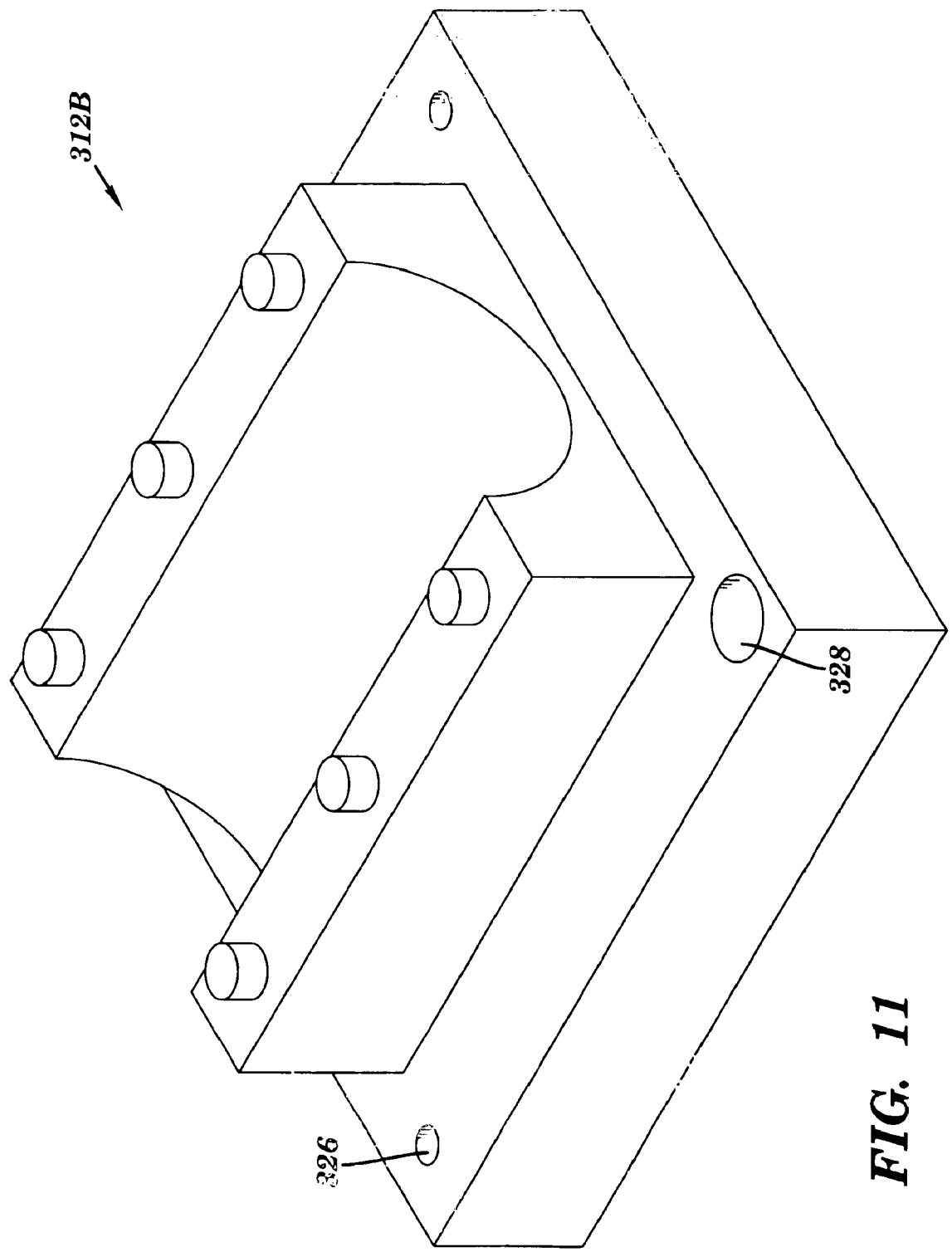
FIG. 11 is a perspective view of one embodiment of a mold core used to fabricate the upper motor mount of FIG. 8.
Figure 12:
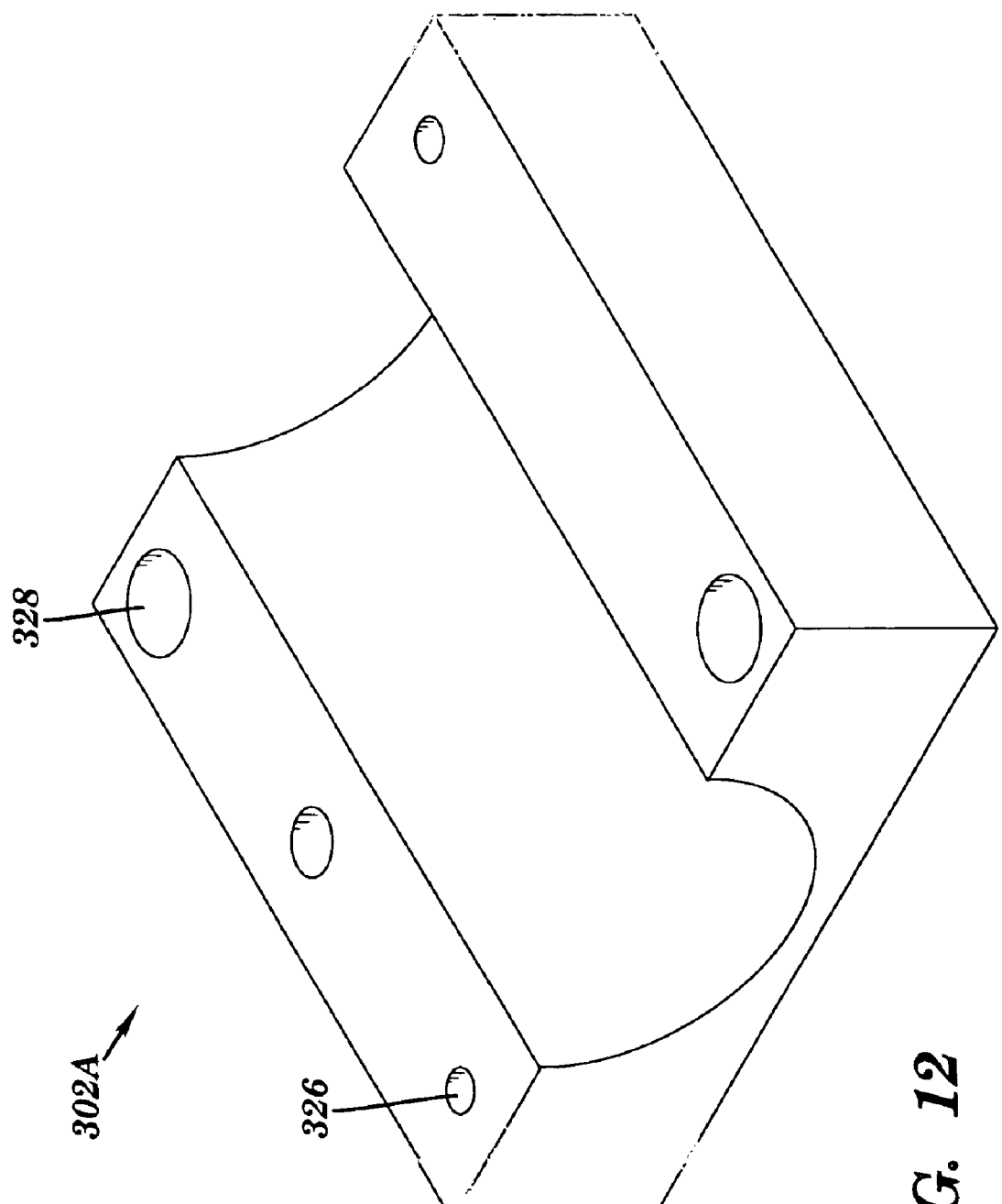
FIG. 12 is a perspective view of one embodiment of a mold cavity used to fabricate the lower motor mount of FIG. 9.
Figure 13:
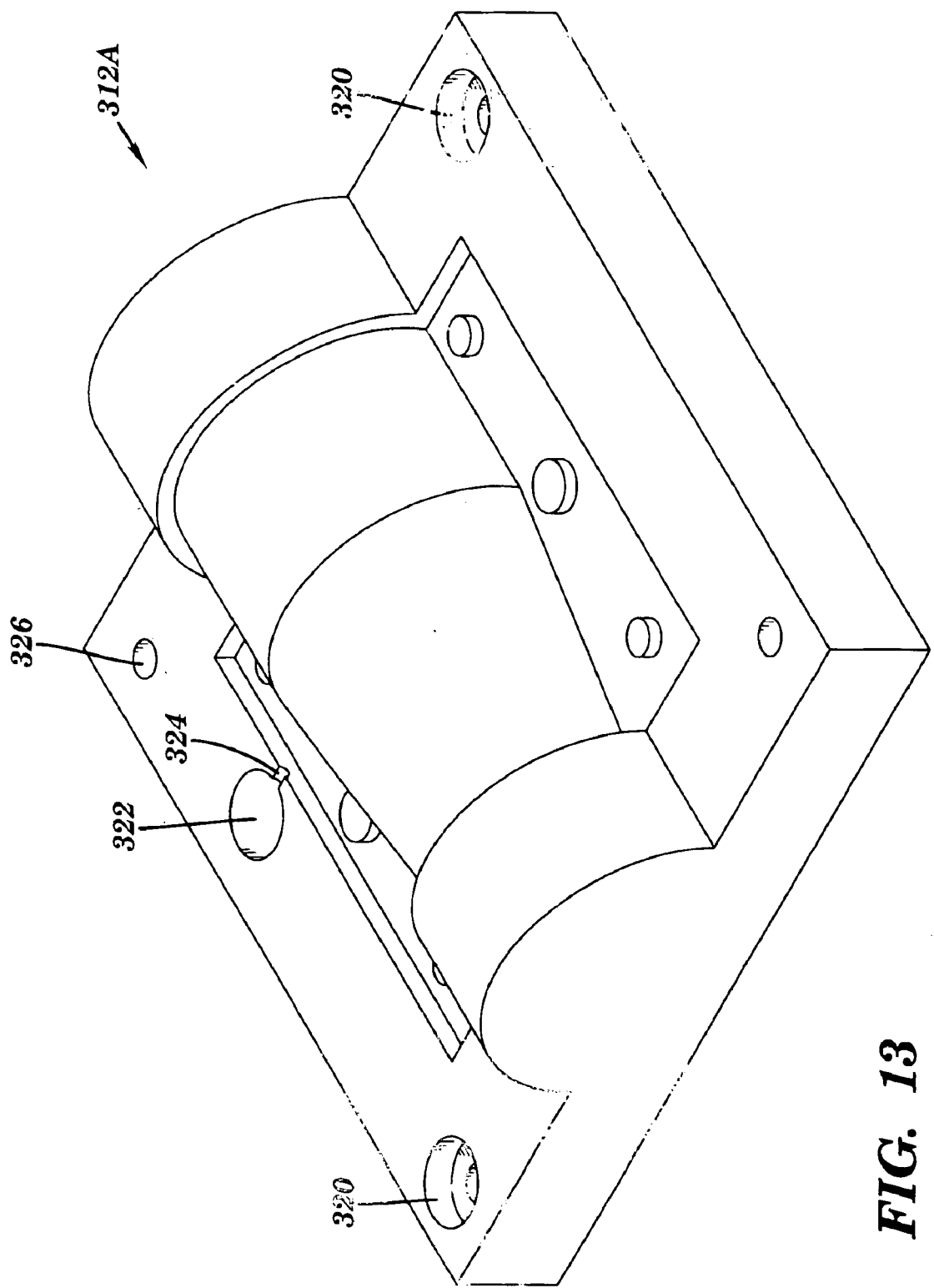
FIG. 13 is a perspective view of one embodiment of a mold core used to fabricate the lower motor mount of FIG. 9.

Referring now to FIGS. 8–9, an embodiment of motor mounts 122A, 122B used in this invention is discussed in more detail. The mounts 122A, 122B are suitably sized and shaped for securely engaging a circumferential surface of a screwdriver motor (such as those available from Black and Decker Corporation, Towson, Md.) that has been modified by cutting the body thereof in the vicinity of a frusto-conical taper (e.g., disposed proximate to the motor's inner planetary gear train). The resulting motors 120 are thus defined by a tapered-cylindrical shape, i.e., are defined by a cylindrical body that fairs into a frusto-conical end portion.

Directional terms such as 'upper', 'lower', underside, etc., are used herein for convenience and clarity to distinguish various components from one another, and refer to directions relative to typical orientation of the soccer robot when used on a level surface. The skilled artisan should recognize that these terms do not denote any particular required orientation, but rather, the components may be physically reversed or otherwise oriented without departing from the spirit and scope of the present invention. As shown, upper motor mount 122A (FIG. 8) is generally rectangular piece and is typically made of plastic. Base (i.e., mounting) portion 202 of motor mount 122A defines a plane, so that it may be relatively securely fastened to a surface of the modular robot body 110 (FIGS. 3 and 6). Mount 122A further includes an tapered-cylindrical cavity 204 (including frusto-conical portion 205), suitably sized and shaped for receiving the modified screwdriver motor 120 therein. Embodiments of mount 122A also include two inner holes 208, which allow it to be fastened (e.g., screwed) to the underside of the modular robot body 110. Mount 122A also includes four outer holes 206, which allow the lower motor mount 122B to be fastened thereto.

The lower motor mount 122B (FIG. 9) is essentially a half-cylindrical shell 222 with flanges 224 at the equator thereof. Mount 122B includes a cylindrical cavity 230 (including frusto-conical portion 232 thereof), suitably sized and shaped for surface-to-surface engagement with the modified screwdriver motor described hereinabove. Mount 122B further includes four outer holes 226 disposed within the flanges 224 for fastening it to upper mount 122A (at holes 206). Clearance holes 228 through tabs 224 provide access to the inner holes 208 of upper mount 122A.

Mounts 122A and 122B are configured for being firmly fastened together in surface-to-surface engagement with an exterior surface of screwdriver motor 120 disposed therebetween. The motor 120, which may be thought of as being sandwiched between mounts 122A and 122B, is typically held firmly in place by both compressive and frictional forces. The motor mounts 122A, 122B are thus also configured for firmly fastening to a flat portion of body 110 of the modular robot 100, 100', 100" as described hereinabove, to hold motor(s) 120 firmly in place.

Referring now to FIGS. 10–13, mounts 122A and 122B are typically fabricated by an injection molding process (although they may be fabricated by other processes such as conventional machining). Each mold includes a mold cavity 302A, 302B and a mold core 312A, 312B, which are typically fabricated by machining aluminum blocks (e.g., alloy 6061). Mold cavity 302A and mold core 312A (FIGS. 10–11) are sized and shaped to fit together and define an interior cavity, which is substantially the same shape as upper mount 122A, while mold cavity 302B and mold core 312B (FIGS. 12–13) are sized and shaped to fit together and define an interior cavity, which is substantially the same shape as lower mount 122B. Core 312A and cavity 302B include recessed mounting holes 320 for fastening to a typical injection-molding machine. Core 312A and cavity 302B each further include a hole 322 and a sprue 324 that allow for the passage of molten liquid into the interior cavities of the molds. The mold components further include holes 326 for mounting the respective mold cavities to mold cores. Cavity 302A and core 312B include a pair of large holes 326 for providing access to holes 320 in core 312A and cavity 302B, respectively.

The robot 100, 100', 100" of this invention is described as modular in that it includes essentially interchangeable parts (i.e., modules) that may be combined in a plurality of configurations and therefore provide for functional flexibility. For example, FIGS. 1 and 4 contrast two unique configurations (robots 100 and 100'). Note that the robots 100 and 100' are assembled with substantially similar modules, however, in robot 100 flippers 140 are oriented essentially perpendicularly to the drive axis 133 of wheels 130, while in robot 100' flippers 140 are oriented at approximately 45 degrees to the drive axis 133 of wheels 130. The artisan of ordinary skill in the art will readily recognize that the modular robot of this invention may be assembled in numerous other configurations other than those shown in FIGS. 1 and 4. For example, robots 100, 100', 100" may be configured with front wheel drive (with remote control box 150 defining the "back"). Additionally, body 110 may be reshaped by cutting or by the addition of further mounting holes (e.g., by drilling or punching) to allow for a plurality of other configurations.

The modular robot of this invention may be used as a teaching tool to teach one or more of the general principles of mechanical engineering and robotics and also to generate interest and excitement in the discipline of mechanical engineering. The teaching tool may be used in a seminar or a project environment in which students construct a robot as described hereinabove and participate in a teamed competition wherein teams (e.g., of three or four robots) compete in a competition of modular robotic remote control soccer.

Each student is typically provided with a kit of parts. The kit generally includes each of the modules described hereinabove, and/or parts necessary to assemble those modules, as well as parts necessary to assemble the modules into the modular robots, such as screws, bolts, nuts, washers, springs, pins, sockets, cable, connectors, switches, and the like. The kit may also include small hand tools, such as wire cutters, wire strippers, screwdrivers, wrenches, pliers, cutting tools, and the like. The kit may also include a complete set of instructions for assembling and wiring the soccer robot. Other equipment may be required to assemble and wire the robots, such as hand drills, drill presses, band saws, soldering irons, drill taps, and the like. These tools, along with appropriate supervision and safety training, are typically provided in the seminar context.

Figure 14:
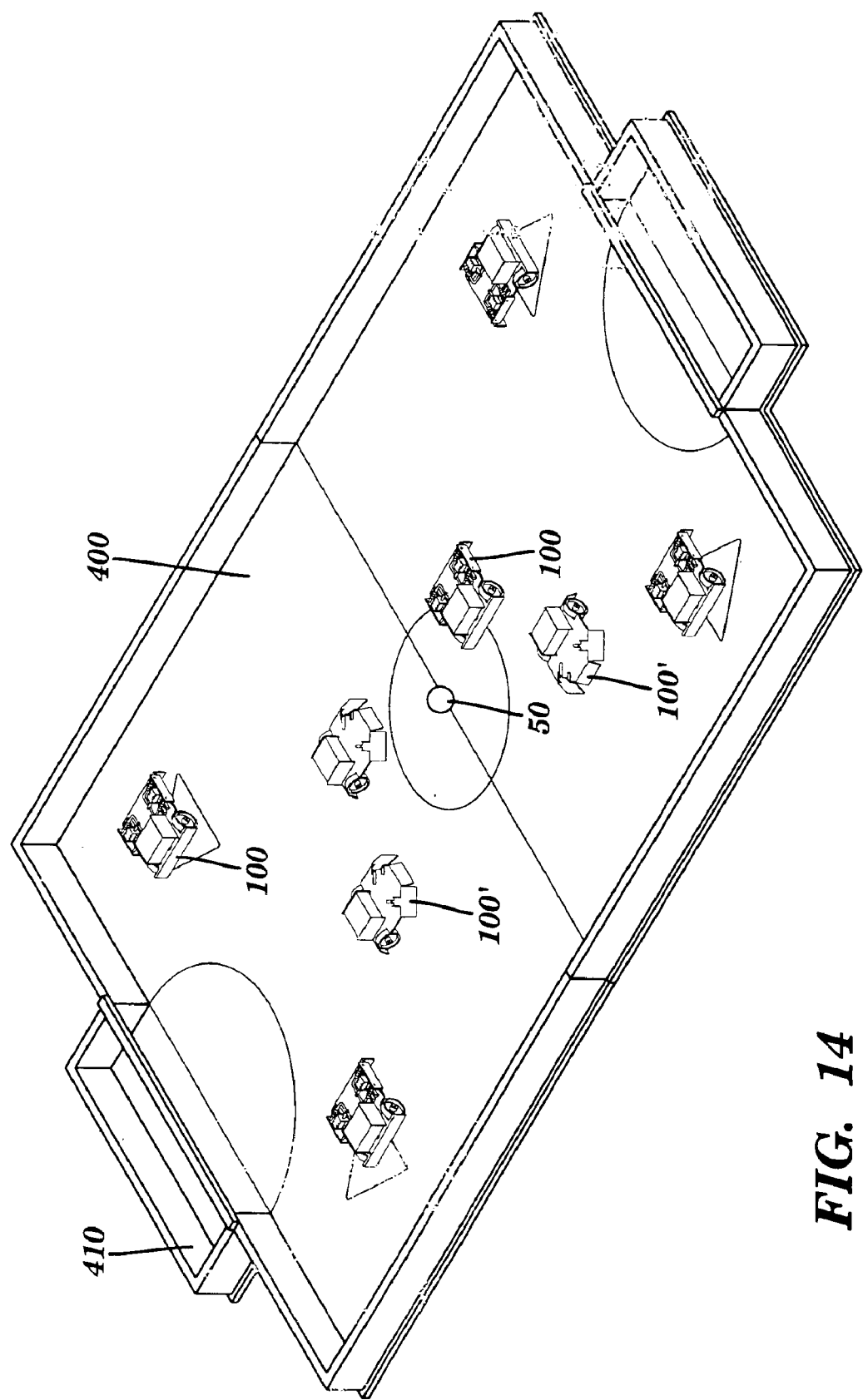
FIG. 14 is a schematic representation of a soccer field including teams of remote control modular robots, such as those shown in FIGS. 1–6.
Figure 15:
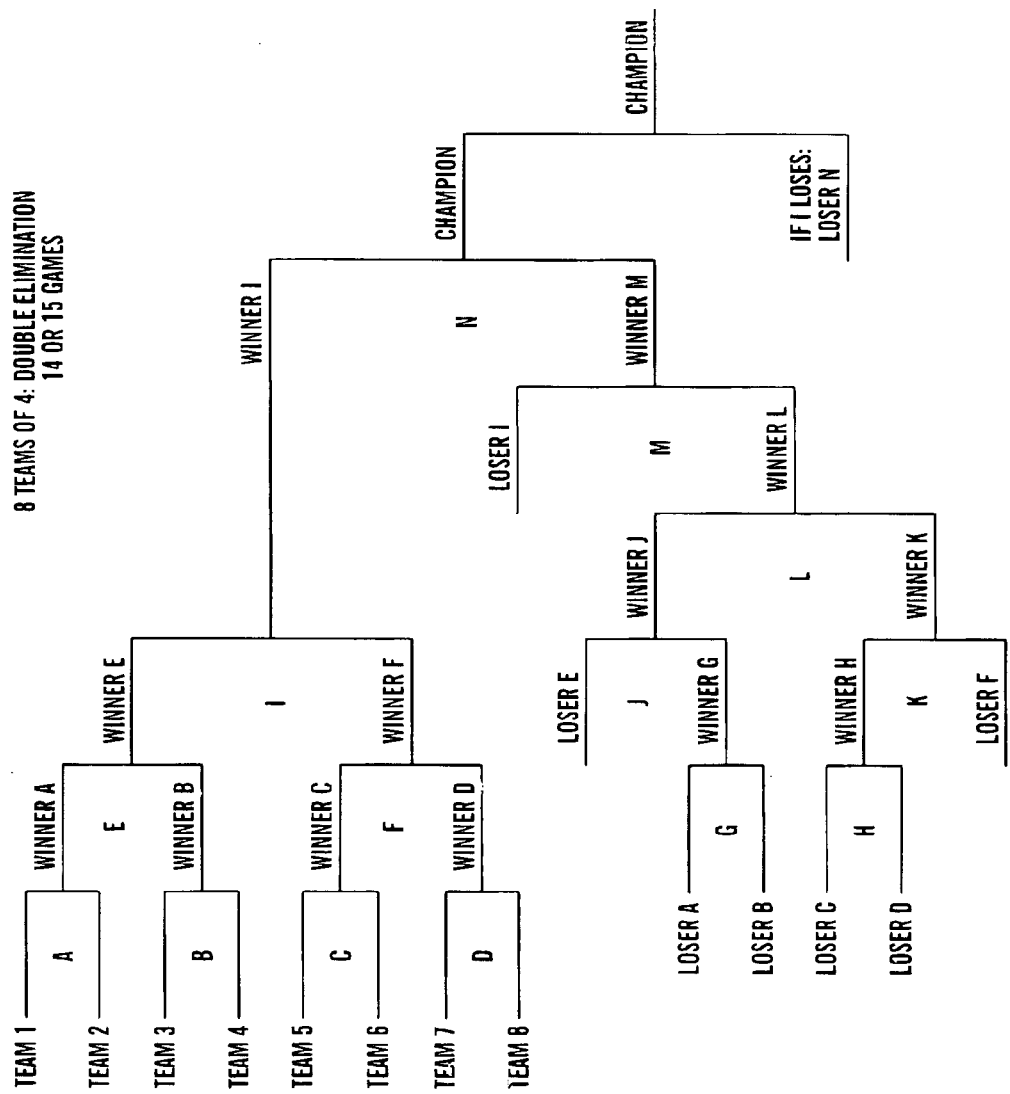
FIG. 15 shows an exemplary bracket for a double elimination remote control robot soccer tournament including eight teams of four robots each.

The soccer competition typically includes a playing field 410 (such as that shown in FIG. 14) with goals 412, a ball 50, and a score keeping apparatus (not shown). A set of rules and regulations configured to keep the students safe and the robots undamaged is also typically provided. The competition may be performed on substantially any playing field. Moreover, such competition may involve a partnership with other institutions, such as, for example, a local science museum. Such a competition may be held at the museum facilities, to allow interaction with the general public and to enrich the educational experience for the prospective students. For a seminar including 32 students, an eight-team double elimination tournament may be desirable. One example of a bracket for such a tournament is shown in FIG. 15.

The modifications to the various aspects of the present invention described hereinabove are merely exemplary. It is understood that other modifications to the illustrative embodiments will readily occur to persons with ordinary skill in the art. All such modifications and variations are deemed to be within the scope and spirit of the present invention as defined by the accompanying claims.

What is claimed is:

1. A modular robot for introducing principles of mechanical engineering and robotics to prospective students, said modular robot comprising a plurality of modules, said plurality of modules including:

a body module;

a first motor and a second motor;

said first motor and said second motor being battery powered electric motors, said first motor and said second motor being mountable to said body module;

a first motor mount and a second motor mount, said first motor mount and said second motor mount each including a mounting portion which defines a plane to provide stable contact with said body module;

at least three wheels, a first of said at least three wheels being operatively engageable with said first motor, a second of said at least three wheels being operatively engageable with said second motor, and one other of said at least three wheels being mountable to said body module;

at least one flipper module being mountable to said body module, said at least one flipper module including an actuatable flipper;

a remote control module configured to provide for actuation control of at least one other of said plurality of modules;

wherein said first and second motors and said at least one flipper module are electrically connectable to said remote control module;

wherein said modular robot may be assembled in any one of a plurality of configurations; and at least one bumper formed by bending a portion of said module.

2. A modular robot for introducing principles of mechanical engineering and robotics to prospective students, said modular robot comprising a plurality of modules, said plurality of modules including:

a body module;

a first motor and a second motor;

said first motor and said second motor being battery nowered electric motors, said first motor and said second motor being mountable to said body module;

a first motor mount and a second motor mount, said first motor mount and said second motor mount each including a mounting portion which defines a plane to provide stable contact with said body module;

at least three wheels, a first of said at least three wheels being operatively engageable with said first motor, a second of said at least three wheels being operatively engageable with said second motor, and one other of said at least three wheels being mountable to said body module;

at least one flipper module being mountable to said body module, said at least one flipper module including an actuatable flipper;

a remote control module configured to provide for actuation control of at least one other of said plurality of modules;

wherein said first and second motors and said at least one flipper module are electrically connectable to said remote control module;

wherein said modular robot may be assembled in any one of a plurality of configurations; and wherein said at least one flipper module comprises a solenoid for actuation of said flipper.

3. The modular robot of claim 2 further comprising a housing for enclosing and protecting said remote control module, said housing being mountable to said body module.

4. The modular robot of claim 3 wherein said housing comprises a hollow plastic shell formed by the process of thermoforming.

5. The modular robot of claim 3 wherein said housing comprises a plurality of fins.

6. The modular robot of claim 3 wherein said housing comprises a plurality of reliefs and indentations in a surface thereof for providing mechanical rigidity and an appealing aesthetic appearance.

7. The modular robot of claim 2 wherein said body module comprises a plastic sheet having a plurality of holes formed therein for the mounting of others of said plurality of modules.

8. The modular robot of claim 2 wherein said first motor and said second motor each have an irregularly shaped frusto-conical surface.

9. The modular robot of claim 2 comprising four wheels, two drive wheels, one of which is operatively engageable with said first motor and the other of which is operatively engageable with said second motor, and two other wheels mountable to said body module.

10. The modular robot of claim 9 where said two drive wheels comprise polyolefin wheels and said two other wheels comprise castor wheels.

11. The modular robot of claim 2 wherein said solenoid is mountable to said body module and said flipper comprises a substantially rectangular plastic sheet sized and shaped for mounting to said solenoid.

12. The modular robot of claim 2 wherein said remote control module comprises a tethered control module electrically coupleable to at least one other of said plurality of modules.

13. The modular robot of claim 2 wherein said remote control module is configured to provide for remote actuation of said first motor, said second motor, and said flipper module and wherein said first motor, said second motor and said flipper module are electrically coupleable thereto.

14. The modular robot of claim 2 wherein said modular robot is configured for playing radio controlled robotic soccer.

15. The modular robot of claim 2 comprising a housing being suitably sized and shaped for mounting to the body module and for enclosing and protecting the remote control module, said housing comprising:
   a plastic sheet formed into a hollow shell by the process of thermoforming;
   said shell including a plurality of fins disposed thereon;
   said shell further including a plurality of reliefs and indentations in the surface thereof for providing mechanical rigidity and an appealing aesthetic appearance;
   said housing being configured for mounting to said body module.

16. The modular robot of claim 15 wherein:
   said fins are sufficiently tapered to enable stacking of a plurality of said housing in an interlocking manner;
   said housing further comprising mounting tabs for mounting said housing to the body portion; and
   said shell further including indicia and colored symbols for providing identification.

17. A kit of parts for assembling a modular robot configured to introduce principles of mechanical engineering and robotics to prospective students, said kit of parts comprising the plurality of modules of claim 2.

18. A modular robot for introducing principles of mechanical engineering and robotics to prospective students, said modular robot comprising a plurality of modules, said plurality of modules including:
   a body module;
   a first motor and a second motor;
   said first motor and said second motor being battery powered electric motors, said first motor and said second motor being mountable to said body module;
   a first motor mount and a second motor mount, said first motor mount and said second motor mount each including a mounting portion which defines a plane to provide stable contact with said body module;
   at least three wheels, a first of said at least three wheels being operatively engageable with said first motor, a second of said at least three wheels being operatively engageable with said second motor, and one other of said at least three wheels being mountable to said body module;
   at least one flipper module being mountable to said body module, said at least one flipper module including an actuatable flipper;
   a remote control module configured to provide for actuation control of at least one other of said plurality of modules;
   wherein said first and second motors and said at least one flipper module are electrically connectable to said remote control module;
   wherein said modular robot may be assembled in any one of a plurality of configurations;
   wherein said remote control module is mountable to said body module and comprises a radio receiver providing for radio controlled actuation of at least one other of said plurality of modules; and
   wherein said remote control module is magnetically mountable to said body module.

19. A modular robot for introducing principles of mechanical engineering and robotics to prospective students, said modular robot comprising a plurality of modules, said plurality of modules including:
   a body module;
   a first motor and a second motor;
   said first motor and said second motor being battery powered electric motors, said first motor and said second motor being mountable to said body module;
   a first motor mount and a second motor mount, said first motor mount and said second motor mount each including:
      a first motor mount portion;
      a second motor mount portion;
      at least one off said first motor mount portion and second motor mount portion having a mounting surface which defines a plane; and
      said first motor mount portion and said second motor mount portion each being sized and shaped for surface-to-surface engagement with a substantially 180 degree portion of the exterior surface of one of said first motor and said second motor, wherein said first motor mount portion and said second motor mount portion are configured to firmly sandwich one of said first motor and said second motor therebetween upon fastening one to another;
   at least three wheels, a first of said at least three wheels being operatively engageable with said first motor, a second of said at least three wheels being operatively engageable with said second motor, and one other of said at least three wheels being mountable to said body module;
   at least one flipper module being mountable to said body module, said at least one flipper module including an actuatable flipper; a remote control module configured to provide for actuation control of at least one other of said plurality of modules;
   wherein said first and second motors and said at least one flipper module are electrically connectable to said remote control module;

wherein said modular robot may be assembled in any one of a plurality of configurations; and wherein said first motor mount portion comprises a mounting portion which defines a plane for mounting to said body module, and an opposite side that has a tapered cylindrical shape for engaging one of said first motor and said second motor, holes for fastening to said second motor mount portion, and holes for fastening to said body module.

20. The modular robot of claim 19 wherein said first motor mount portion and said second motor mount portion are fabricated by injection molding a plastic material.

21. A modular robot for introducing principles of mechanical engineering and robotics to prospective students, said modular robot comprising a plurality of modules, said plurality of modules including:

a body module;

a first motor and a second motor;

said first motor and said second motor being battery powered electric motors, said first motor and said second motor being mountable to said body module;

a first motor mount and a second motor mount, said first motor mount and said second motor mount each including:

a first motor mount portion;

a second motor mount portion;

at least one of said first motor mount portion and second motor mount portion having a mounting surface which defines a plane; and said first motor mount portion and said second motor mount portion each being sized and shaped for surface-to-surface engagement with a substantially 180 degree portion of the exterior surface of one of said first motor and said second motor, wherein said first motor mount portion and said second motor mount portion are configured to firmly sandwich one of said first motor and said second motor therebetween upon fastening one to another;

a mounting portion which defines a plane to provide stable contact with said body module;

at least three wheels, a first of said at least three wheels being operatively engageable with said first motor, a second of said at least three wheels being operatively engageable with said second motor, and one other of said at least three wheels being mountable to said body module;

at least one flipper module being mountable to said body module, said at least one flipper module including an actuatable flipper;

a remote control module configured to provide for actuation control of at least one other of said plurality of modules;

wherein said first and second motors and said at least one flipper module are electrically connectable to said remote control module;

wherein said modular robot may be assembled in any one of a plurality of configurations; and wherein said second motor mount portion comprises a tapered cylindrical shape for engaging one of said first motor and said second motor and holes for fastening to said first motor mount portion.

22. A motor mount for a modular robot, the modular robot including a body module having a substantially planar mounting plate, a motor having an irregular frusto-conical exterior surface, and a plurality of wheels mounted to the body module, at least one of the wheels being operatively engageable with the motor, said motor mount comprising:

a first motor mount portion;

a second motor mount portion; at least one of said first motor mount portion and said second motor mount portion having a mounting portion which defines a plane;

said first motor mount portion and said second motor mount portion each being sized and shaved for surface-to-surface engagement with substantially a 180 degree portion of the exterior surface of the motor, wherein said first motor mount portion and said second motor mount portion are configured to firmly sandwich the motor therebetween upon fastening one to another; wherein:

the modular robot includes a first motor and a second motor, said first motor and said second motor being battery powered electric motors and being mountable to said body module, and a plurality of wheels mountable to said body portion, one of said wheels being operatively engageable with said first motor and another of said wheels being operatively engageable with said second motor;

said first motor mount portion includes a mounting portion which defines a plane for mounting to the body module and an opposite side that has a tapered cylindrical shape for engaging one of said first motor and said second motor, holes for fastening to said second motor mount portion, and holes for fastening to said body module;

said second motor mount portion includes a tapered cylindrical shape for engaging one of said first motor and said second motor and holes for fastening to said first motor mount portion; and said first motor mount portion and said second motor mount portion are configured for fastening one to another about an electric motor, which is disposed therebetween.

* * * * *

UNITED STATES PATENT AND TRADEMARK OFFICE
CERTIFICATE OF CORRECTION

PATENT NO. : 6,877,574 B2
DATED : April 12, 2005
INVENTOR(S) : Thompson et al.

It is certified that error appears in the above-identified patent and that said Letters Patent is hereby corrected as shown below:

Column 8,
Line 36, "Nowered", should read -- Powered --;

Column 12,
Line 22, "shaved", should read -- shaped --.

Signed and Sealed this

Sixteenth Day of August, 2005

JON W. DUDAS
*Director of the United States Patent and Trademark Office*